US012665118B2

(12) United States Patent
Tsujibayashi et al.

(10) Patent No.: US 12,665,118 B2
(45) Date of Patent: Jun. 23, 2026

(54) INDUCTOR COMPONENT

(71) Applicant: Murata Manufacturing Co., Ltd., Kyoto-fu (JP)

(72) Inventors: Tarou Tsujibayashi, Nagaokakyo (JP); Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 865 days.

(21) Appl. No.: 17/820,134

(22) Filed: Aug. 16, 2022

(65) Prior Publication Data

US 2023/0084390 A1 Mar. 16, 2023

(30) Foreign Application Priority Data

Sep. 15, 2021 (JP) ................................ 2021-150322

(51) Int. Cl.
*H01F 27/24* (2006.01)
*H01F 27/02* (2006.01)
*H01F 27/28* (2006.01)

(52) U.S. Cl.
CPC ............. *H01F 27/24* (2013.01); *H01F 27/02* (2013.01); *H01F 27/2823* (2013.01)

(58) Field of Classification Search
CPC .... H01F 27/24; H01F 27/2823; H01F 27/263; H01F 17/045; H01F 27/292; H01F 17/04; H01F 27/29
See application file for complete search history.

(56) References Cited

U.S. PATENT DOCUMENTS 6,373,366 B1 * 4/2002 Sato ...................... H01F 27/292 336/200
10,867,736 B2 * 12/2020 Kojima ................... H01F 27/29
2003/0071704 A1 * 4/2003 Toi .......................... H01F 27/36 336/83
2008/0224813 A1 * 9/2008 Hirai ..................... H01F 17/045 336/216
2012/0133469 A1 * 5/2012 Tomonari ............. H01F 27/292 336/192

(Continued)

FOREIGN PATENT DOCUMENTS

CN 1267067 A 9/2000
CN 1289179 A 3/2001

(Continued)

*Primary Examiner* — Mang Tin Bik Lian
(74) *Attorney, Agent, or Firm* — Studebaker Brackett PLLC

(57) ABSTRACT

An inductor component includes a drum-shaped core, a wire, and a top plate. The drum-shaped core includes a winding core portion, a first flange portion, and a second flange portion. The winding core portion has a columnar shape extending along a central axis as a center. The first flange portion is connected to a first end of the winding core portion. The wire is wound around the winding core portion. The top plate is connected to the first flange portion. The top plate includes a first projection that protrudes toward the first flange portion. The first projection includes a distal end face that is parallel to a principal surface and a side surface that extends from the distal end face toward the principal surface. The side surface includes a vertical surface that is linked to a first end face and is flush with the first end face.

17 Claims, 4 Drawing Sheets

(56) References Cited

U.S. PATENT DOCUMENTS

| | | | | |
|---|---|---|---|---|
| 2018/0182534 | A1* | 6/2018 | Horie | H01F 27/292 |
| 2019/0244744 | A1* | 8/2019 | Takenaka | H01F 17/045 |
| 2020/0203070 | A1* | 6/2020 | Takahashi | H01F 3/10 |
| 2021/0065960 | A1* | 3/2021 | Shinohara | H01F 41/04 |

FOREIGN PATENT DOCUMENTS

| | | | | |
|---|---|---|---|---|
| CN | 209571292 | U | | 11/2019 |
| JP | 2000-269050 | A | | 9/2000 |
| JP | 2009-147158 | | * | 7/2009 |
| JP | 2009-147158 | A | | 7/2009 |
| JP | 2009-147159 | A | | 7/2009 |
| JP | 2013-077857 | A | | 4/2013 |
| JP | 2018-107248 | A | | 7/2018 |
| JP | 2018-174219 | A | | 11/2018 |
| JP | 2019-135763 | A | | 8/2019 |
| JP | 2020-178071 | A | | 10/2020 |

* cited by examiner

INDUCTOR COMPONENT

CROSS-REFERENCE TO RELATED APPLICATION

This application claims benefit of priority to Japanese Patent Application No. 2021-150322, filed Sep. 15, 2021, the entire content of which is incorporated herein by reference.

BACKGROUND

Technical Field

The present disclosure relates to an inductor component.

Background Art

The coil component according to Japanese Unexamined Patent Application Publication No. 2018-107248 includes a drum-shaped core, a top plate, and a coil. The drum-shaped core includes a winding core portion, a first flange portion, and a second flange portion. The winding core portion has a columnar shape extending along a central axis as a center. The first flange portion is connected to a first end of the winding core portion. The first flange portion juts outward from a peripheral surface of the winding core portion. The second flange portion is connected to a second end of the winding core portion. The second flange portion juts outward from the peripheral surface of the winding core portion. The top plate is a flat plate extending elongatedly in a direction along the central axis of the winding core portion. The top plate includes, at positions facing the first flange portion, a plurality of projections which protrude from a principal surface of the top plate toward the first flange portion. The top plate also includes, at positions facing the second flange portion, a plurality of projections which protrude toward the principal surface of the top plate or the second flange portion. A distal end of each projection is in contact with the first flange portion or the second flange portion. Each projection has a taper shape. That is, a side surface of each projection is inclined. Specifically, each projection decreases concentrically in diameter from the principal surface of the top plate toward the flange portion. The distal end of each projection is flat.

SUMMARY

In the coil component according to Japanese Unexamined Patent Application Publication No. 2018-107248, the projections have taper shapes. For this reason, it is necessary on the principal surface of the top plate to secure, as a space for arrangement of projections, an area larger than an area of contact between distal ends of the projections and the flange portions. Thus, it is hard to miniaturize a top plate and, by extension, an inductor component.

Accordingly, the present disclosure provides an inductor component including a drum-shaped core, a wire, and a top plate. The drum-shaped core has a columnar winding core portion that extends along a central axis as a center, a first flange portion that is connected to a first end of the winding core portion in a direction in which the central axis extends and juts outward in a radial direction from the central axis as the center as viewed from a peripheral surface of the winding core portion, and a second flange portion that is connected to a second end of the winding core portion in the direction, in which the central axis extends, and juts outward in the radial direction from the central axis as the center as viewed from the peripheral surface of the winding core portion. The wire is wound around the winding core portion. The top plate is connected to the first flange portion and the second flange portion. The top plate includes a principal surface that faces the first flange portion, an end face that is vertical to the principal surface, and a projection that protrudes from a position facing the first flange portion on the principal surface toward the first flange portion. The projection includes a distal end face that is parallel to the principal surface and a side surface that extends from the distal end face toward the principal surface. The side surface includes an inclined surface that is inclined with respect to the end face and a vertical surface that is linked to the end face and is flush with the end face.

In the above-described configuration, a portion flush with the end face of the side surface of the projection is vertical to the principal surface. That is, the portion flush with the end face of the side surface of the projection does not have a shape spreading toward the principal surface. It is thus possible to reduce a projection arrangement space on the principal surface of the top plate, as compared with a shape in which a whole of the side surface of the projection is inclined.

Also, the present disclosure provides an inductor component including a drum-shaped core, a wire, and a top plate. The drum-shaped core has a columnar winding core portion that extends along a central axis as a center, a first flange portion that is connected to a first end of the winding core portion in a direction in which the central axis extends and juts outward in a radial direction from the central axis as the center as viewed from a peripheral surface of the winding core portion, and a second flange portion that is connected to a second end of the winding core portion in the direction, in which the central axis extends, and juts outward in the radial direction from the central axis as the center as viewed from the peripheral surface of the winding core portion. The wire is wound around the winding core portion. The top plate is connected to the first flange portion and the second flange portion. The top plate includes a principal surface that faces the first flange portion. The first flange portion includes a first flat surface that faces the principal surface, an end face that is vertical to the first flat surface, and a projection that protrudes from a position facing the top plate on the first flat surface toward the top plate. The projection includes a distal end face that is parallel to the first flat surface and a side surface that extends from the distal end face toward the first flat surface. The side surface includes an inclined surface that is inclined with respect to the end face and a vertical surface that is linked to the end face and is flush with the end face.

In the above-described configuration, a portion flush with the end face of the side surface of the projection is vertical to the first flat surface. That is, the portion flush with the end face of the side surface of the projection does not have a shape spreading toward the first flat surface. It is thus possible to reduce a projection arrangement space on the first flat surface of the first flange portion, as compared with a shape in which a whole of the side surface of the projection is inclined.

The present disclosure allows reduction in projection installation space.

DETAILED DESCRIPTION

An embodiment of an inductor component will be described below with reference to the drawings. Note that constituent elements may be shown on an enlarged scale for ease of comprehension. Dimensional ratios of constituent elements may be different from actual ones or those in a different drawing.

First Embodiment

Figure 1:
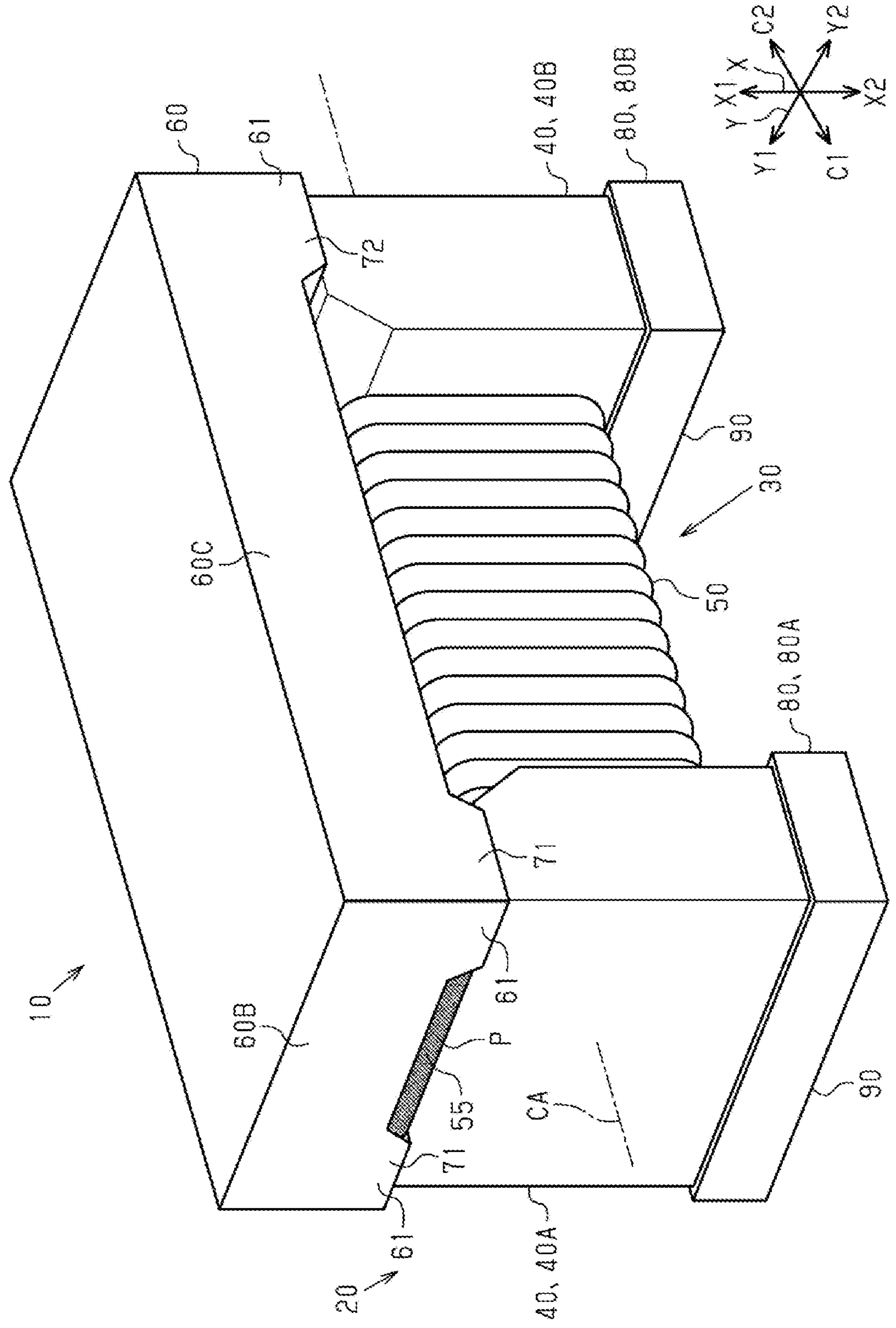
FIG. 1 is a perspective view of an inductor component according to a first embodiment.

As shown in FIG. 1, an inductor component 10 includes a drum-shaped core 20, a wire 50, a top plate 60, and two outer electrodes 80.

The drum-shaped core 20 includes a winding core portion 30 and one pair of flange portions 40. The winding core portion 30 extends along a central axis CA as a center.

In the following description, a particular axis orthogonal to the central axis CA will be referred to as a first axis X, and an axis in a direction orthogonal to both the central axis CA and the first axis X will be referred to as a second axis Y. One of directions along the central axis CA will be referred to as a positive direction C1 while a direction opposite to the positive direction C1 will be referred to as a negative direction C2. Similarly, one of directions along the first axis X will be referred to as a first positive direction X1 while a direction opposite to the first positive direction X1 will be referred to as a first negative direction X2. One of directions along the second axis Y will be referred to as a second positive direction Y1 while a direction opposite to the second positive direction Y1 will be referred to as a second negative direction Y2.

A shape of the winding core portion 30 is a substantially quadrangular prism shape. That is, the winding core portion 30 has a substantially quadrangular shape in cross-section orthogonal to the central axis CA. Two facing sides of the winding core portion 30 are parallel to the first axis X in cross-section orthogonal to the central axis CA. The two remaining sides of the winding core portion 30 are parallel to the second axis Y in cross-section orthogonal to the central axis CA.

A first flange portion 40A which is one of the one pair of flange portions 40 is connected to a first end which is an end in the positive direction C1 of the winding core portion 30.

The first flange portion 40A has, on the whole, a substantially rectangular parallelepiped shape which is small in a dimension in the directions along the central axis CA and is low-profile. The first flange portion 40A juts outward in a radial direction from the central axis CA as a center as viewed from a peripheral surface of the winding core portion 30. That is, a dimension in the directions along the first axis X of the first flange portion 40A is larger than a dimension in the directions along the first axis X of the winding core portion 30. A dimension in the directions along the second axis Y of the first flange portion 40A is larger than a dimension in the directions along the second axis Y of the winding core portion 30.

An end face facing the first positive direction X1 of outer surfaces of the first flange portion 40A is orthogonal to the first axis X. An end face facing the first negative direction X2 of the outer surfaces of the first flange portion 40A is orthogonal to the first axis X.

A second flange portion 40B which is one of the one pair of flange portions 40 is connected to a second end which is an end in the negative direction C2 of the winding core portion 30. The second flange portion 40B is symmetrical in shape to the first flange portion 40A in the directions along the central axis CA. That is, the second flange portion 40B juts outward in the radial direction from the central axis CA as the center as viewed from the peripheral surface of the winding core portion 30.

A material for the drum-shaped core 20 is a magnetic material. For example, magnetic ceramic typified by nickel zinc ferrite, magnetic metal powder, ceramic powder, a synthetic resin material, a mixture thereof, and the like can be adopted as the material for the drum-shaped core 20.

A first outer electrode 80A which is one of the two outer electrodes 80 is located at an end in the first negative direction X2 of the first flange portion 40A. Specifically, the first outer electrode 80A is arranged at a portion on the first negative direction X2 side as viewed from the central axis CA of the outer surfaces of the first flange portion 40A, particularly a portion which juts from the peripheral surface of the winding core portion 30 toward the first negative direction X2 side. The first outer electrode 80A is located at the end face on the first negative direction X2 side and respective parts of four surfaces adjacent to the end face in the first flange portion 40A.

A second outer electrode 80B which is the other one of the two outer electrodes 80 is located at an end in the first negative direction X2 of the second flange portion 40B. Specifically, the second outer electrode 80B is arranged at a portion on the first negative direction X2 side as viewed from the central axis CA of the outer surfaces of the second flange portion 40B, particularly a portion which juts from the peripheral surface of the winding core portion 30 toward the first negative direction X2 side. The second outer electrode 80B is located at the end face on the first negative direction X2 side and respective parts of four surfaces adjacent to the end face in the second flange portion 40B.

Each outer electrode 80 is composed of, for example, a metal layer of, for example, silver or copper and a plated layer of, for example, nickel or tin applied to the surface of the metal layer. Note that the end faces on the first negative direction X2 side, that is, surfaces on which the outer electrodes 80 are arranged of the outer surfaces of the first flange portion 40A and the second flange portion 40B are mounting surfaces 90. The mounting surfaces 90 are orthogonal to the first axis X. Note that a layer structure of the outer electrode 80 is not shown in the drawings.

The wire 50 is wound around the winding core portion 30. The wire 50 is wound in a helical shape having the central axis CA as a winding central axis on the whole. The wire 50 has a structure in which wiring made of copper or the like is covered with an insulative coating from outside in the radial direction. A first end of the wire 50 is connected to the first outer electrode 80A. A second end of the wire 50 is connected to the second outer electrode 80B.

The top plate 60 has, on the whole, a substantially rectangular parallelepiped shape which is small in a dimension in the directions along the first axis X and is low-profile. A material for the top plate 60 is the same magnetic material as the material for the drum-shaped core 20.

Figure 2:
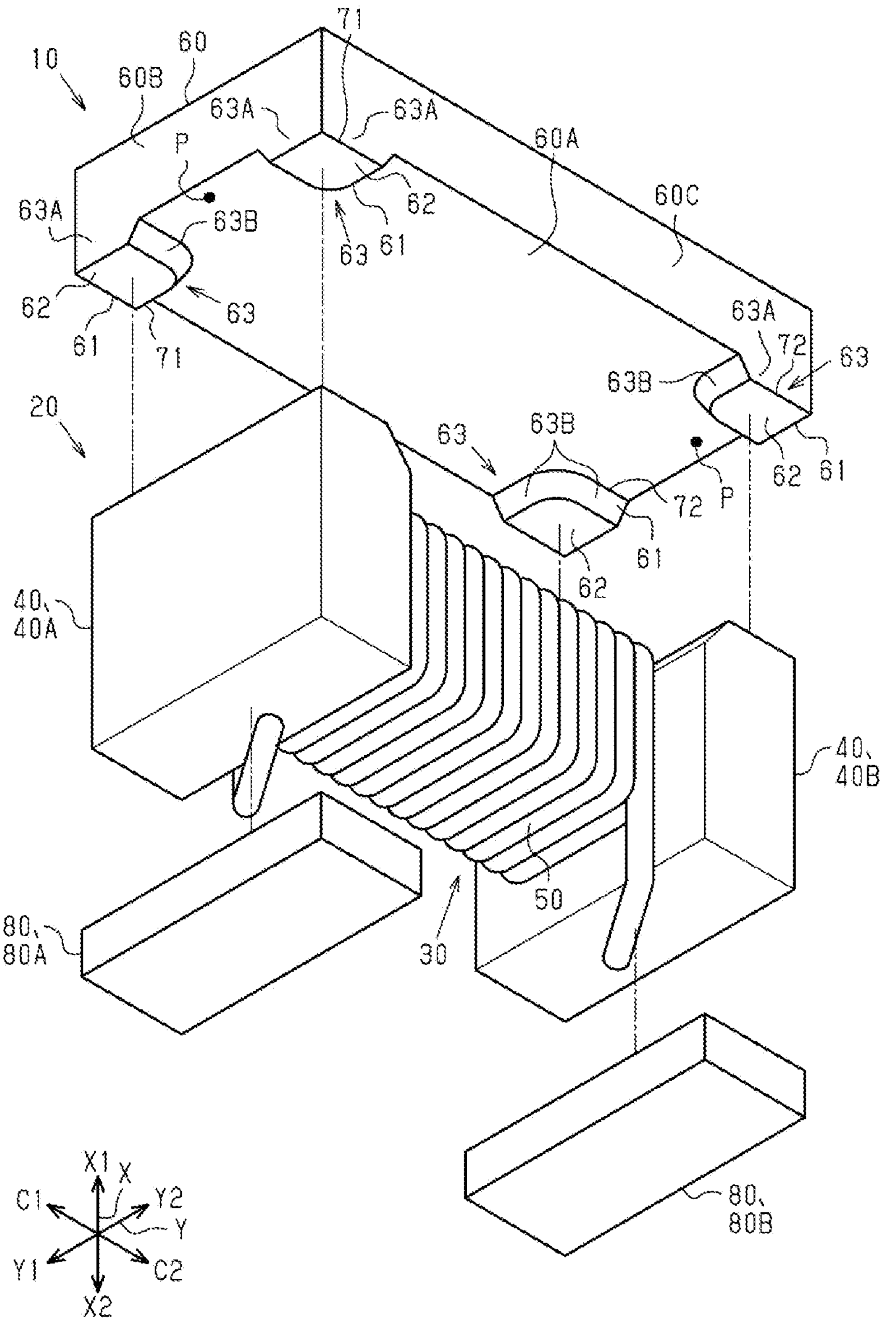
FIG. 2 is an exploded perspective view of the inductor component according to the first embodiment.

As shown in FIG. 2, the top plate 60 includes a principal surface 60A, two first end faces 60B, and two second end faces 60C. The principal surface 60A is a surface facing the first flange portion 40A and the second flange portion 40B of the top plate 60. Note that, when the principal surface 60A is viewed in a direction orthogonal to the principal surface 60A, the principal surface 60A has a rectangular shape.

Figure 3:
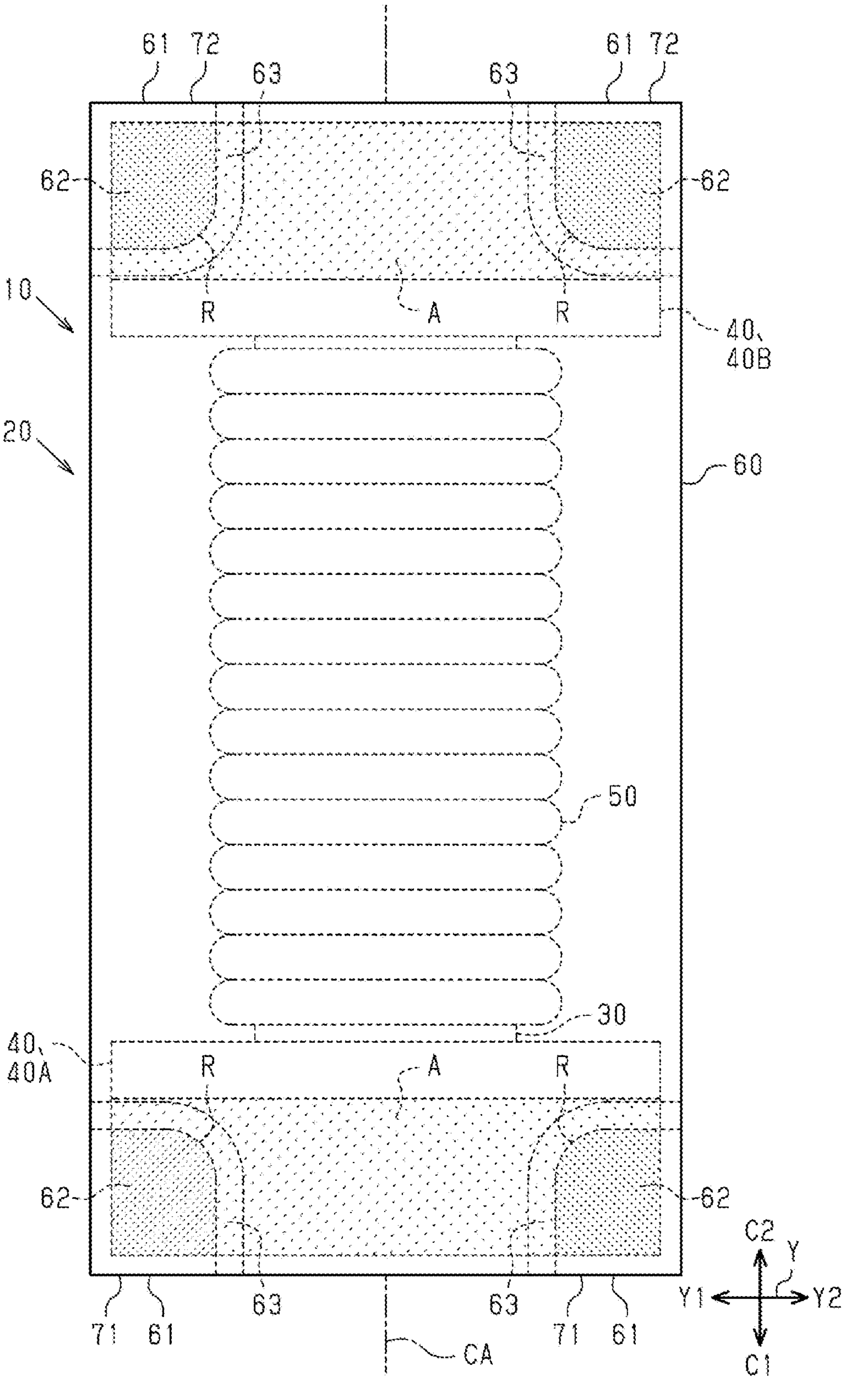
FIG. 3 is a transparent plan view of the inductor component according to the first embodiment.

As shown in FIG. 3, a dimension of the top plate 60 in the directions along the central axis CA is longer than a dimension of the drum-shaped core 20 in the directions along the central axis CA. Note that the dimension of the drum-shaped core 20 in the directions along the central axis CA is a distance from an end on the positive direction C1 side in the first flange portion 40A to an end on the negative direction C2 side in the second flange portion 40B. Assume here that a dimension in a direction orthogonal to the central axis CA and parallel to the principal surface 60A and the mounting surface 90, that is, a dimension in the directions along the second axis Y is a width dimension. A width dimension of the top plate 60 is longer than width dimensions of the first flange portion 40A and the second flange portion 40B. Note that a dimension in the directions along the central axis CA, a width dimension, and a dimension in the directions along the first axis X of the drum-shaped core 20 are, for example, 1.6 mm, 0.8 mm, and 1.1 mm, respectively.

As shown in FIG. 1, the top plate 60 is connected to the end face in the first positive direction X1 of the first flange portion 40A with a resin 55 interposed therebetween. The top plate 60 is also connected to an end face in the first positive direction X1 of the second flange portion 40B with the resin 55 interposed therebetween. That is, the top plate 60 is connected to the flange portions 40 so as to lie astride the first flange portion 40A and the second flange portion 40B. The resin 55 has adhesive force. That is, the resin 55 bonds the top plate 60 and the flange portions 40 together. Note that the resin 55 is not shown in FIGS. 2 and 3.

The first end faces 60B are surfaces vertical to the principal surface 60A. In the present embodiment, the first end faces 60B are an end face in the positive direction C1 and an end face in the negative direction C2, respectively, of the outer surfaces of the top plate 60.

The second end faces 60C are surfaces vertical to the principal surface 60A and the first end faces 60B. That is, the first end faces 60B and the second end faces 60C are vertical to each other. In the present embodiment, the second end faces 60C are an end face in the second positive direction Y1 and an end face in the second negative direction Y2, respectively, of the top plate 60.

The top plate 60 includes four projections 61. The four projections 61 are located at respective corner portions of the principal surface 60A. Two projections 61 of the four projections 61 are first projections 71 which protrude from positions facing the first flange portion 40A in the principal surface 60A toward the first flange portion 40A. The two remaining projections 61 of the four projections 61 are second projections 72 which protrude from positions facing the second flange portion 40B in the principal surface 60A toward the second flange portion 40B.

As shown in FIG. 2, the first projections 71 and the second projections 72 each have a substantially quadrangular shape when the top plate 60 is viewed in the first positive direction X1. The first projections 71 and the second projections 72 each have a taper shape which decreases in a dimension in the directions along the central axis CA and a dimension in the directions along the second axis Y, along the first negative direction X2. That is, the first projections 71 and the second projections 72 each have a substantially truncated quadrangular pyramid shape.

Each first projection 71 includes a distal end face 62 and four side surfaces 63. The distal end face 62 is a surface closest to the first flange portion 40A of outer surfaces of the first projection 71. The distal end face 62 is parallel to the principal surface 60A. A part of the distal end face 62 is in contact with the first flange portion 40A. The distal end face 62 has a substantially quadrangular shape when the distal end face 62 is viewed in the first positive direction X1. Sides on an outer edge of the distal end face 62 are parallel to sides on an outer edge of the top plate 60.

The four side surfaces 63 are surfaces extending from the distal end face 62 toward the principal surface 60A of the outer surfaces of the first projection 71. The side surfaces 63 extend from the respective sides of the distal end face 62. The side surfaces 63 are continuous with one another.

The four side surfaces 63 are broadly divided into two vertical surfaces 63A and two inclined surfaces 63B. The vertical surfaces 63A are surfaces parallel to the first axis X. That is, the vertical surfaces 63A are surfaces vertical to the central axis CA or the second axis Y.

One of the two vertical surfaces 63A is linked to the first end face 60B and is flush with the first end face 60B. In other words, there is no level difference between the vertical surface 63A and the first end face 60B, and the vertical surface 63A and the first end face 60B are linked to each other on the same plane. That is, there is no surface parallel to the principal surface 60A at a junction between the vertical surface 63A and the first end face 60B. The vertical surface 63A is a surface facing the positive direction C1 of the outer surfaces of the first projection 71. The vertical surface 63A corresponds to a first vertical surface which is linked to the first end face 60B and is flush with the first end face 60B.

The other one of the two vertical surfaces 63A is linked to the second end face 60C and is flush with the second end face 60C. In other words, there is no level difference between the vertical surface 63A and the second end face 60C, and the vertical surface 63A and the second end face 60C are linked to each other on the same plane. That is, there is no surface parallel to the principal surface 60A at a junction between the vertical surface 63A and the second end face 60C. The vertical surface 63A is a surface facing outward in the directions along the second axis Y of the outer surfaces of the first projection 71. The vertical surface 63A corresponds to a second vertical surface which is linked to the second end face 60C and is flush with the second end face 60C.

Each inclined surface 63B is inclined with respect to the first axis X. That is, each inclined surface 63B is inclined with respect to the first end face 60B and the second end face 60C. The inclined surface 63B reflects the substantially truncated quadrangular pyramid shape of the first projection 71 and is inclined so as to be more away from a center of the distal end face 62 along the first positive direction X1.

Each second projection 72 includes the distal end face 62 and four side surfaces 63, like the above-described first projection 71. The four side surfaces 63 are broadly divided into two vertical surfaces 63A and two inclined surfaces 63B. One of the two vertical surfaces 63A is linked to the first end face 60B and is flush with the first end face 60B. The other one of the two vertical surfaces 63A is linked to the second end face 60C and is flush with the second end face 60C. That is, the vertical surface 63A facing the negative direction C2 of the vertical surfaces 63A of the second projection 72 corresponds to a first vertical surface which is linked to the first end face 60B and is flush with the first end face 60B. The vertical surface 63A facing outward in the directions along the second axis Y of the vertical surfaces 63A of the second projection 72 corresponds to a second vertical surface which is linked to the second end face 60C and is flush with the second end face 60C.

Note that the two first projections 71 have the same dimensions and are symmetrical in shape to each other. The two second projections 72 have the same dimensions and are symmetrical in shape to each other. The two first projections 71 on the positive direction C1 side and the two second projections 72 on the negative direction C2 side are symmetrical in structure and arrangement to each other in the directions along the central axis CA.

Assume here that a range where the distal end face 62 of the first projection 71 and the first flange portion 40A overlap when the inductor component 10 is viewed in the first negative direction X2 is an overlap range R, as shown in FIG. 3. More specifically, the overlap range R is a range where the distal end face 62 and the first flange portion 40A are in contact. Note that the term contact also subsumes contact between two with adhesive interposed therebetween. Since there are two first projections 71 facing the first flange portion 40A in this embodiment, there are two overlap ranges R.

The sum of areas of the two overlap ranges R is not more than ⅓ of an area A over which the first flange portion 40A faces the top plate 60. Note that a surface where the first flange portion 40A faces the top plate 60 is a surface parallel to the principal surface 60A in the first flange portion 40A and is included in surfaces facing toward the principal surface 60A. Of the surfaces, a range where the first flange portion 40A overlaps with the principal surface 60A when the inductor component 10 is viewed in the first negative direction X2 is regarded as the surface where the first flange portion 40A faces the top plate 60. Thus, in this embodiment, the area A is equal to an area of the end face on the first positive direction X1 side in the first flange portion 40A.

As described above, the second flange portion 40B is symmetrical in shape to the first flange portion 40A in the directions along the central axis CA. Thus, if ranges where the distal end faces 62, facing the second flange portion 40B, of the second projections 72 and the second flange portion 40B overlap are assumed as overlap ranges R, the sum of areas of the two overlap ranges R is not more than ⅓ of an area A over which the second flange portion 40B faces the top plate 60.

Note that, as described above, the dimension in the directions along the central axis CA and the dimension in the directions along the second axis Y in the top plate 60 are both larger than the dimensions of the drum-shaped core 20. Thus, when the inductor component 10 is viewed in the first negative direction X2, parts of the distal end faces 62 of the first projections 71 and the second projections 72 stick out from the drum-shaped core 20.

Since the top plate 60 has the first projections 71, as shown in FIG. 1, a space P is formed between the principal surface 60A of the top plate 60 and the end face on the first positive direction X1 side of the first flange portion 40A. The space P is filled with the above-described resin 55. Here, a plurality of first projections 71 are arrayed in the directions along the second axis Y of the first flange portion 40A. That is, a region which is surrounded by the two first projections 71, the top plate 60, and the surface facing the principal surface 60A in the first flange portion 40A is filled with the resin 55 in the present embodiment. In the present embodiment, the resin 55 covers a whole surface on the first positive direction X1 side of each flange portion 40. Note that a thickness of the resin 55 between the first flange portion 40A and the distal end face 62 is negligibly small, as compared with a thickness of the resin 55 between the flange portion 40 and the principal surface 60A. The resin 55 may contain, for example, magnetic powder, such as ferrite powder. If the resin 55 contains magnetic powder, a saturation magnetic flux density when a current is applied to the inductor component 10 can be adjusted. That is, DC superimposition characteristics can be adjusted. Note that a space P is similarly filled with the resin 55 on the second flange portion 40B side.

Here, a method for manufacturing the inductor component 10 will be described.

First, to produce the drum-shaped core 20, ferrite powder is put into a mold, and press molding is performed. A compact obtained by the press molding is sintered. The sintered compact is subjected to barrel finishing, fins and the like are removed, and the drum-shaped core 20 is produced. The top plate 60 is also produced through the same processes. For this reason, each projection 61 has a taper shape on the whole such that a mold can be quickly released after press molding using the mold.

The outer electrodes 80 are stacked on ends in the first negative direction X2 of the drum-shaped core 20. The wire 50 is wound around the winding core portion 30 of the drum-shaped core 20. End portions of the wire 50 are connected to the first outer electrode 80A and the second outer electrode 80B, respectively, by heating and pressure bonding. Portions of the wire 50 which stick out from the outer electrodes 80 are cut off. Note that although the wire 50 and the outer electrodes 80 are shown as separated components in FIG. 2, the end portions of the wire 50 are located inside the first outer electrode 80A and the second outer electrode 80B, respectively, in the inductor component 10.

Similarly, the top plate 60 after press molding and sintering is subjected to barrel finishing, and fins and the like are removed. The resin 55 is applied to the end faces on the first positive direction X1 side of the flange portions 40 of the drum-shaped core 20, and the top plate 60 is bonded.

<Simulation in Inductor Component of First Embodiment>

An inductance to be obtained was simulated by changing the shapes of the first projection 71 and the second projection 72 and changing the area of each overlap range R. Specifically, an inductance to be obtained was simulated by changing the overlap ranges R such that a value of the sum of the overlap ranges R/a value of the area A falls within the range of 1 to ⅙. Note that parameters for the overlap ranges R on the first flange portion 40A side and the overlap ranges R on the second flange portion 40B side are identical in the simulation. Here, a state where the value of the sum of the overlap ranges R/the value of the area A is 1 is a state where the two first projections 71 are integral and the whole end face on the first positive direction X1 side of the first flange portion 40A is in contact with the first projections 71. The same applies to the second projections 72.

An inductance generated when a sufficiently small fixed current causing no magnetic flux saturation was applied to an inductor component was regarded as an initial L value. In this case, the initial L value decreased gradually as the value of the sum of the overlap ranges R/the value of the area A decreased from 1.

When the value of the sum of the overlap ranges R/the value of the area A decreased from 1 to ⅓, the initial L value decreased rapidly. For example, the initial L value when the value of the sum of the overlap ranges R/the value of the area A was ⅓ was about 40% of the initial L value when the value of the sum of the overlap ranges R/the value of the area A was 1.

On the other hand, when the value of the sum of the overlap ranges R/the value of the area A was smaller than ⅓, the initial L value did not decrease much even though the value of the sum of the overlap ranges R/the value of the area A decreased. For example, the initial L value when the value of the sum of the overlap ranges R/the value of the area A was ⅙ was about 85% of the initial L value when the value of the sum of the overlap ranges R/the value of the area A was ⅓.

The above-described results showed that, when the value of the sum of the overlap ranges R/the value of the area A was not more than ⅓, influence on the initial L value of the inductor component could be curbed despite changes in dimensions of the flange portion 40 and the top plate 60 due to manufacturing errors or the like.

An inductance generated when a large fixed current which may cause magnetic flux saturation was applied to the inductor component was regarded as a saturation L value. In this case, the saturation L value increased gradually as the value of the sum of the overlap ranges R/the value of the area A decreased from 1. Note that the fact that the saturation L value is large means that even application of a large current is unlikely to cause the inductance to decrease from the initial L value.

When the value of the sum of the overlap ranges R/the value of the area A decreased from 1 to ⅓, the saturation L value increased rapidly. For example, the saturation L value when the value of the sum of the overlap ranges R/the value of the area A was ⅓ was about 4.5 times the saturation L value when the value of the sum of the overlap ranges R/the value of the area A was 1. On the other hand, when the value of the sum of the overlap ranges R/the value of the area A was smaller than ⅓, the saturation L value did not increase much and was substantially constant even though the value of the sum of the overlap ranges R/the value of the area A decreased.

The above-described results showed that, when the value of the sum of the overlap ranges R/the value of the area A was not more than ⅓, influence on the saturation L value, that is, DC superimposition characteristics of the inductor component could be curbed despite changes in the dimensions of the flange portion 40 and the top plate 60 due to manufacturing errors or the like. It was also found out that since an inductor component with the above-described configuration could curb influence on DC superimposition characteristics, stable DC superimposition characteristics could be obtained.

Effects of First Embodiment (1-1) In the above-described embodiment, one of the vertical surfaces 63A of the first projection 71 is linked to the first end face 60B and is flush with the first end face 60B. The vertical surface 63A does not have a shape which spreads toward the top plate 60, unlike the inclined surface 63B. Thus, an arrangement space of the first projections 71 on the principal surface 60A of the top plate 60 can be made smaller than in a case where the side surfaces 63 of each first projection 71 are all the inclined surfaces 63B. Note that, since the vertical surface 63A is flush with the first end face 60B, even formation of the top plate 60 by press molding using a mold is unlikely to obstruct release of the mold. In this respect, the same effect can be obtained for the second projections 72 on the second flange portion 40B side.

(1-2) In the embodiment, one of the vertical surfaces 63A of the first projection 71 is linked to the second end face 60C and is flush with the second end face 60C. The proportion of the inclined surfaces 63B to each first projection 71 is smaller than in the case where the side surfaces 63 of the first projection 71 are all the inclined surfaces 63B. That is, the arrangement space of the first projections 71 on the principal surface 60A of the top plate 60 can be further reduced. In this respect, the same effect can be obtained for the second projections 72 on the second flange portion 40B side.

(1-3) In the embodiment, in each of the first flange portion 40A side and the second flange portion 40B, the value of the sum of the overlap ranges R/the value of the area A is not more than ⅓. For this reason, even if the value of the sum of the overlap ranges R/the value of the area A changes somewhat due to manufacturing errors or the like, an initial L value and the DC superimposition characteristics do not change much. That is, in the embodiment, individual variation in characteristics between the inductor components 10 can be curbed.

(1-4) In the embodiment, the ends of the wire 50 are connected to the outer electrodes 80 on a side opposite to a side with the top plate 60. Thus, the ends of the wire 50 do not interfere with the top plate 60. It is not necessary to set height dimensions of the first projection 71 and the second projection 72 with avoidance of interference between the wire 50 and the top plate 60 in mind.

(1-5) In the embodiment, a gap between the principal surface 60A and the surface facing the principal surface 60A of the first flange portion 40A is filled with the resin 55. This configuration allows strengthening of connection between the top plate 60 and the first flange portion 40A. In this respect, the same effect can be obtained for the second flange portion 40B side.

(1-6) In the embodiment, the dimension of the top plate 60 in the directions along the central axis CA is longer than the dimension of the drum-shaped core 20 in the directions along the central axis CA. Assume that a deviation occurs in a relative positional relationship between the top plate 60 and the first flange portion 40A and second flange portion 40B in the directions along the central axis CA at the time of manufacturing of the inductor component 10. Even in this case, with the above-described configuration, an area of contact between the distal end faces 62 and the first flange portion 40A and second flange portion 40B is likely to be kept constant. This is unlikely to cause individual variation in electrical characteristics between the inductor components 10.

(1-7) In the embodiment, the width dimension of the top plate 60 is longer than the width dimension of the drum-shaped core 20. Assume that a deviation occurs in the relative positional relationship between the top plate 60 and the first flange portion 40A and second flange portion 40B in the directions along the second axis Y at the time of manufacturing of the inductor component 10, as in the effect in (1-6). Even in this case, the area of contact between the distal end faces 62 and the first flange portion 40A and second flange portion 40B is likely to be kept constant. This is unlikely to cause individual variation in electrical characteristics between the inductor components 10.

(1-8) When a current is applied to the inductor component 10, a magnetic flux passes from the flange portion 40 to the top plate 60. The magnetic flux is high in density at a portion close to the central axis CA of the flange portion 40. In the present embodiment, the first projections 71 and the second projections 72 are located at corner portions of the top plate 60. This configuration is unlikely to be affected by a change in magnetic flux. For this reason, characteristics of the inductor component 10 are likely to be stable.

Second Embodiment

A second embodiment of an inductor component 10 will be described. The inductor component 10 according to the second embodiment is different in configurations of a first projection 71 and a second projection 72 from the inductor component 10 according to the first embodiment. Other components are the same as in the first embodiment. Points related to the first projection 71 and the second projection 72 will be described below. Note that a description of the same components as those of the first embodiment will be simplified or omitted.

Figure 4:
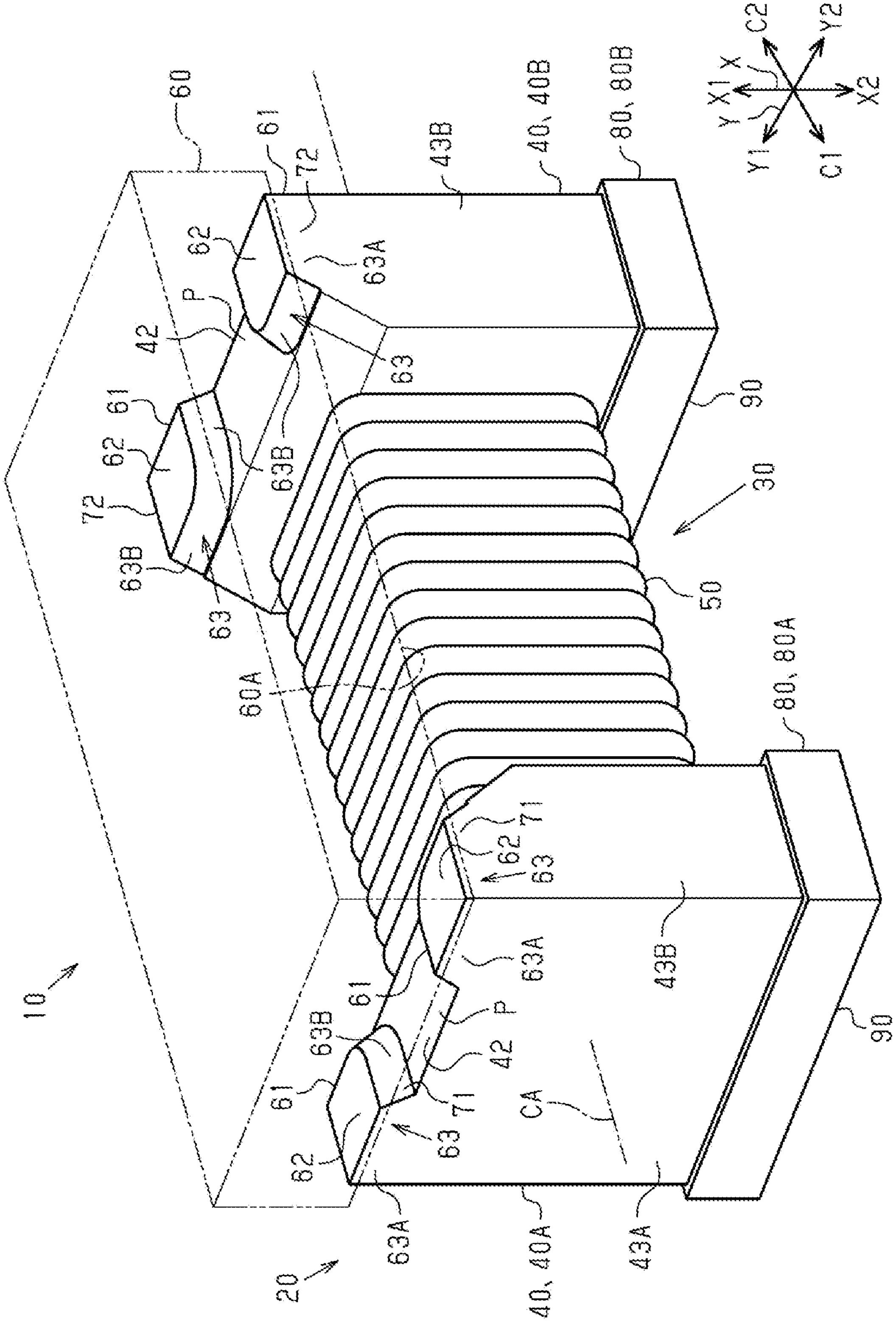
FIG. 4 is a perspective view of an inductor component according to a second embodiment.

As shown in FIG. 4, the inductor component 10 includes a drum-shaped core 20, a wire 50, a top plate 60, and two outer electrodes 80. Note that a resin with which the top plate 60 and flange portions 40 are bonded is not shown in FIG. 4.

The top plate 60 has a rectangular parallelepiped shape which is small in a dimension in directions along a first axis X and is low-profile. The top plate 60 includes a principal surface 60A which faces one pair of flange portions 40 of the top plate 60. Note that the top plate 60 does not include projections in the second embodiment.

A first flange portion 40A of the drum-shaped core 20 includes a first flat surface 42, a first end face 43A, and two second end faces 43B. The first flat surface 42 is a surface facing the principal surface 60A of the first flange portion 40A. That is, the first flat surface 42 is an end face in a first positive direction X1 of the first flange portion 40A.

The first end face 43A is a surface vertical to the first flat surface 42. In the present embodiment, the first end face 43A is a surface facing away from a winding core portion 30 of outer surfaces of the flange portion 40. That is, the first end face 43A of the first flange portion 40A is an end face in a positive direction C1 of the outer surfaces of the first flange portion 40A. The first end face 43A of a second flange portion 40B is an end face in a negative direction C2 of the outer surfaces of the second flange portion 40B.

Each second end face 43B is a surface vertical to the first flat surface 42 and the first end face 43A. That is, the first end face 43A and the second end face 43B are vertical to each other. In the present embodiment, the second end faces 43B are an end face in a second positive direction Y1 and an end face in a second negative direction Y2 of the outer surfaces of the first flange portion 40A.

The first flange portion 40A includes two first projections 71. Each first projection 71 protrudes from a position facing the top plate 60 on the first flat surface 42 toward the top plate 60. The first projections 71 are located at an end in the second positive direction Y1 and an end on the second negative direction Y2 side, respectively, in the first flange portion 40A.

Each first projection 71 has a substantially quadrangular shape when the first flange portion 40A is viewed in a first negative direction X2. Each first projection 71 has a taper shape which decreases in a dimension in directions along a central axis CA and a dimension in directions along a second axis Y, along the first positive direction X1. That is, each first projection 71 has a substantially truncated quadrangular pyramid shape.

Each first projection 71 includes a distal end face 62 and four side surfaces 63. The distal end face 62 is a surface closest to the top plate 60 of outer surfaces of the first projection 71. The distal end face 62 is parallel to the first flat surface 42. The distal end face 62 is in contact with the top plate 60. The distal end face 62 has a substantially quadrangular shape when the distal end face 62 is viewed in the first negative direction X2. Sides on an outer edge of the distal end face 62 are parallel to sides on an outer edge of the flange portion 40.

The four side surfaces 63 are surfaces extending from the distal end face 62 toward the first flat surface 42 of the outer surfaces of the first projection 71. The side surfaces 63 extend from the respective sides of the distal end face 62. The side surfaces 63 are continuous with one another.

The four side surfaces 63 are broadly divided into two vertical surfaces 63A and two inclined surfaces 63B. The vertical surfaces 63A are surfaces parallel to the first axis X. That is, the vertical surfaces 63A are surfaces vertical to the central axis CA or the second axis Y. One of the two vertical surfaces 63A is linked to the first end face 43A and is flush with the first end face 43A. In other words, there is no level difference between the vertical surface 63A and the first end face 43A, and the vertical surface 63A and the first end face 43A are like the same plane and are linked to each other. That is, there is no surface parallel to the principal surface 60A at a junction between the vertical surface 63A and the first end face 43A. The vertical surface 63A is a surface facing the positive direction C1 of the outer surfaces of the first projection 71. The vertical surface 63A corresponds to a first vertical surface which is linked to the first end face 43A and is flush with the first end face 43A.

The other one of the two vertical surfaces 63A is linked to the second end face 43B and is flush with the second end face 43B. In other words, there is no level difference between the vertical surface 63A and the second end face 43B, and the vertical surface 63A and the second end face 43B are linked to each other on the same plane. That is, there is no surface parallel to the principal surface 60A at a junction between the vertical surface 63A and the second end face 43B. The vertical surface 63A is a surface facing outward in the directions along the second axis Y of the outer surfaces of the first projection 71. The vertical surface 63A corresponds to a second vertical surface which is linked to the second end face 43B and is flush with the second end face 43B.

Each inclined surface 63B is inclined with respect to the first axis X. That is, each inclined surface 63B is inclined with respect to the first end face 43A and the second end face 43B. The inclined surface 63B reflects the substantially truncated quadrangular pyramid shape of the first projection 71 and is inclined so as to be more away from a center of the distal end face 62 along the first negative direction X2.

The second flange portion 40B includes two second projections 72. Each second projection 72 protrudes from a position facing the top plate 60 on the first flat surface 42 toward the top plate 60. The second projections 72 are located at an end in the second positive direction Y1 and an end on the second negative direction Y2 side, respectively, in the second flange portion 40B.

Each second projection 72 has a substantially quadrangular shape when the second flange portion 40B is viewed in the first negative direction X2. Each second projection 72 has a taper shape which decreases in a dimension in the directions along the central axis CA and a dimension in the directions along the second axis Y, along the first positive direction X1. That is, each second projection 72 has a substantially truncated quadrangular pyramid shape.

Each second projection 72 includes the distal end face 62 and four side surfaces 63, like the above-described first projection 71. The four side surfaces 63 are broadly divided into two vertical surfaces 63A and two inclined surfaces 63B. One of the two vertical surfaces 63A is linked to the first end face 43A and is flush with the first end face 43A. The other one of the two vertical surfaces 63A is linked to the second end face 43B and is flush with the second end face 43B. That is, the vertical surface 63A facing the negative direction C2 of the vertical surfaces 63A of the second projection 72 corresponds to a first vertical surface which is linked to the first end face 43A and is flush with the first end face 43A. The vertical surface 63A facing outward in the directions along the second axis Y of the vertical surfaces 63A of the second projection 72 corresponds to a second vertical surface which is linked to the second end face 43B and is flush with the second end face 43B.

Note that the two first projections 71 have the same dimensions and are symmetrical in shape to each other. The two second projections 72 have the same dimensions and are symmetrical in shape to each other. The two first projections 71 on the positive direction C1 side and the two second projections 72 on the negative direction C2 side are symmetrical in structure and arrangement to each other in the directions along the central axis CA.

Assume here that a range where the distal end face 62 of the first projection 71 and the top plate 60 overlap when the inductor component 10 is viewed in the first negative direction X2 is an overlap range R. More specifically, the overlap range R is a range where the distal end face 62 and the top plate 60 are in contact. Note that the term contact also subsumes contact between two with adhesive interposed therebetween. Since there are two first projections 71 on the first flange portion 40A side in this embodiment, there are two overlap ranges R. Note that an area of each overlap range R is equal to an area of each distal end face 62 in this embodiment. The sum of the areas of the two overlap ranges R is not more than ⅓ of an area A over which the first flange portion 40A faces the top plate 60. Note that a surface where the first flange portion 40A faces the top plate 60 is a surface parallel to the principal surface 60A of the first flange portion 40A and is included in surfaces facing toward the principal surface 60A. Of the surfaces, a range where the first flange portion 40A overlaps with the principal surface 60A when the inductor component 10 is viewed in the first negative direction X2 is regarded as the surface where the first flange portion 40A faces the top plate 60.

A configuration of an overlap range R is the same on the second flange portion 40B side as on the first flange portion 40A side. That is, if ranges where the distal end faces 62 of the second projections 72 facing the second flange portion 40B and the second flange portion 40B overlap are assumed as overlap ranges R, the sum of areas of the two overlap ranges R is not more than ⅓ of an area A over which the second flange portion 40B faces the top plate 60.

Effects of Second Embodiment

Effects of the second embodiment will be described. The inductor component 10 according to the second embodiment has the following effects in addition to the effects in (1-3) to (1-7) of the first embodiment.

(2-1) In the above-described embodiment, one of the vertical surfaces 63A of each first projection 71 is linked to the first end face 43A and is flush with the first end face 43A. That is, the vertical surface 63A does not have a shape which spreads toward the top plate 60, unlike the inclined surface 63B. Thus, an arrangement space of the first projections 71 on the first flat surface 42 of the first flange portion 40A can be made smaller than in a case where the side surfaces 63 of the first projection 71 are all the inclined surfaces 63B. Note that, since the vertical surface 63A is flush with the first end face 43A, even formation of the drum-shaped core 20 by press molding using a mold is unlikely to obstruct release of the mold. In this respect, the same effect can be obtained for the second projections 72.

(2-2) In the embodiment, one of the vertical surfaces 63A of each first projection 71 is linked to the second end face 43B and is flush with the second end face 43B. In the embodiment, the proportion of the inclined surfaces 63B to the first projection 71 is smaller than in the case where the side surfaces 63 of the first projection 71 are all the inclined surfaces 63B. That is, the arrangement space of the first projections 71 on the first flat surface 42 of the first flange portion 40A can be further reduced. In this respect, the same effect can be obtained for the second projections 72.

<Modifications>

The present embodiments can be changed and carried out in the following manner. The present embodiments and the following modifications can be carried out in combination without technical contradiction.

In each embodiment, the winding core portion 30 may have any shape as long as the shape is a columnar shape. For example, the winding core portion 30 may have a circular column shape. The shapes of the first flange portion 40A and the second flange portion 40B are not limited to low-profile, rectangular parallelepiped shapes. It is only necessary that the first flange portion 40A and the second flange portion 40B jut outward in the radial direction from the central axis CA as the center as viewed from the peripheral surface of the winding core portion 30.

In each embodiment, the top plate 60 may be the same as or shorter than the drum-shaped core 20 in a dimension in the directions along the central axis CA. Similarly, the top plate 60 may be the same as or shorter than the flange portion 40 in width dimension. It is only necessary that the top plate 60 is connected so as to lie astride the first flange portion 40A and the second flange portion 40B.

In each embodiment, positions of the outer electrodes 80 are not limited to the ends on the first negative direction X2 side as viewed from the central axis CA of the outer surfaces of the first flange portion 40A and the second flange portion 40B. For example, the outer electrodes 80 may be arranged at the end faces on the first positive direction X1 side of the first flange portion 40A and the second flange portion 40B.

In each embodiment, one first projection 71 may be provided at a position where the top plate 60 and the first flange portion 40A face, and the second projection 72 need not be provided at a position facing the second flange portion 40B in the top plate 60. In this case, a whole of the end face on the first positive direction X1 side is connected to the top plate 60 on the second flange portion 40B side.

In each embodiment, ridge lines and corners of the top plate 60 may be rounded. For example, each of the principal surface 60A and the first end face 60B, the first end face 60B and the second end face 60C, and the second end face 60C and the principal surface 60A may be linked to each other with a rounded boundary therebetween. Similarly, the distal end face 62 and the side surface 63 in the first projection 71 may be linked to each other with a rounded boundary therebetween. The same applies to the second projection 72.

In each embodiment, a part of the first projection 71 may have a truncated cone shape. That is, the first projection 71 only needs to have the vertical surface 63A, and the inclined surface 63B of the first projection 71 may have the shape of a side surface of a truncated cone. The same applies to the second projection 72.

In each embodiment, each projection 61 may have a different shape. That is, the four projections 61 need not be symmetrical in shape. The projections 61 need not be arranged at symmetrical positions.

In each embodiment, the sum of the areas of the overlap ranges R may be larger than ⅓ of the area A, over which the first flange portion 40A faces the top plate 60. Note that, if the value of the sum of the areas of the overlap ranges R/the value of the area A is less than 1/30, an initial L value is considerably small. That is, characteristics are close to those in a case where the inductor component 10 does not include the top plate 60. If the value of the sum of the areas of the overlap ranges R/the value of the area A is less than 1/30, the dimensions of the first projection 71 are hard to accurately control.

Thus, in terms of balance between inductance and DC superimposition characteristics and manufacturability of the first projection 71, the ratio is preferably not more than ⅓ and not less than 1/30. In terms of the manufacturability of the first projection 71, the ratio is preferably not less than 1/10. The same applies to the overlap ranges R on the second flange portion 40B side.

In each embodiment, only a part of the space P between the top plate 60 and the end face on the first positive direction X1 side of the first flange portion 40A may be filled with the resin 55. If the top plate 60 and the first flange portion 40A are securely connected, the space P need not be filled with the resin 55. Note that the same applies to the space P on the second flange portion 40B side.

In the first embodiment, the shape of the top plate 60 need not be a substantially rectangular parallelepiped shape which is low-profile. For example, the top plate 60 may have a polygonal shape, such as a hexagonal shape, when the top plate 60 is viewed from the first positive direction X1. For example, if the top plate 60 has a hexagonal shape, surfaces adjacent to each of the first projection 71 and the second projection 72 of surfaces orthogonal to the principal surface 60A in the top plate 60 will be referred to as the first end face 60B and the second end face 60C, respectively. In this case, although the second end face 60C intersects the first end face 60B, the second end face 60C need not be vertical. The same applies to the second embodiment.

In the first embodiment, a whole of the distal end face 62 of the first projection 71 may be in contact with the drum-shaped core 20. For example, if the dimension in the directions along the central axis CA and the dimension in the directions along the second axis Y in the top plate 60 are made equal to the dimensions of the drum-shaped core 20, the whole of the distal end face 62 of the first projection 71 is in contact with the first flange portion 40A. The same applies to the second projection 72 on the second flange portion 40B side.

In the first embodiment, the first projection 71 may have only one vertical surface 63A. In this case, the vertical surface 63A only needs to be flush with either the first end face 60B or the second end face 60C of the top plate 60. The first projection 71 may include three or more vertical surfaces 63A. In this case, one of the side surfaces 63 of the first projection 71 is flush with the first end face 60B, and the other two of the side surfaces 63 are flush with one pair of second end faces 60C, respectively. The same applies to the second projection 72. The same applies to the second embodiment.

What is claimed is:

1. An inductor component comprising:

a drum-shaped core having a columnar winding core portion that extends along a central axis as a center, a first flange portion that is connected to a first end of the winding core portion in a direction in which the central axis extends and juts outward in a radial direction from the central axis, the radial direction being perpendicular to the direction in which the central axis extends, and a second flange portion that is connected to a second end of the winding core portion in the direction in which the central axis extends, and juts outward in the radial direction from the central axis;

a wire that is wound around the winding core portion; and a top plate that is connected to the first flange portion and the second flange portion, wherein the top plate includes a principal surface that faces the first flange portion, an end face that is vertical to the principal surface, and a projection that protrudes from a position facing the first flange portion on the principal surface toward the first flange portion, the projection includes a distal end face that is parallel to the principal surface and a side surface that extends from the distal end face toward the principal surface, and the side surface includes an inclined surface that is inclined with respect to the end face and a vertical surface that is linked to the end face and is flush with the end face, wherein the inclined surface includes a first inclined surface and a second inclined surface intersecting the first inclined surface.

2. The inductor component according to claim 1, wherein the principal surface has a quadrangular shape when the principal surface is viewed in a direction orthogonal to the principal surface, the end face includes a first end face and a second end face that are vertical to each other, and the vertical surface includes a first vertical surface that is linked to the first end face and is flush with the first end face and a second vertical surface that is linked to the second end face and is flush with the second end face.

3. The inductor component according to claim 1, wherein a range where the distal end face and the first flange portion overlap when the inductor component is viewed in the direction orthogonal to the principal surface is regarded as an overlap range, and a sum of an area of the overlap range is not more than ⅓ of an area over which the first flange portion faces the top plate.

4. The inductor component according to claim 2, wherein a range where the distal end face and the first flange portion overlap when the inductor component is viewed in the direction orthogonal to the principal surface is regarded as an overlap range, and a sum of an area of the overlap range is not more than ⅓ of an area over which the first flange portion faces the top plate.

5. The inductor component according to claim 1, further comprising:

an outer electrode that is arranged at a portion on a side of an outer surface of the first flange portion away from the central axis in a second direction, wherein, of directions orthogonal to the central axis, a direction from the central axis toward the top plate is regarded as a first direction, and a direction opposite to the first direction is regarded as the second direction, wherein an end of the wire is connected to the outer electrode.

6. The inductor component according to claim 1, wherein a gap between the principal surface and a surface facing the principal surface of the first flange portion is filled with resin.

7. The inductor component according to claim 1, wherein a dimension of the top plate in a direction along the central axis is longer than a dimension of the drum-shaped core in the direction along the central axis.

8. The inductor component according to claim 1, wherein a dimension in a direction orthogonal to the central axis and parallel to the principal surface is regarded as a width dimension, and a width dimension of the top plate is longer than a width dimension of the first flange portion.

9. The inductor component according to claim 2, further comprising:

an outer electrode that is arranged at a portion on a side in a second direction as viewed from the central axis of an outer surface of the first flange portion if a direction from the central axis toward the top plate of directions orthogonal to the central axis is regarded as a first direction, and a direction opposite to the first direction is regarded as the second direction, wherein an end of the wire is connected to the outer electrode.

10. The inductor component according to claim 3, further comprising:

an outer electrode that is arranged at a portion on a side in a second direction as viewed from the central axis of an outer surface of the first flange portion if a direction from the central axis toward the top plate of directions orthogonal to the central axis is regarded as a first direction, and a direction opposite to the first direction is regarded as the second direction, wherein an end of the wire is connected to the outer electrode.

11. The inductor component according to claim 2, wherein a gap between the principal surface and a surface facing the principal surface of the first flange portion is filled with resin.

12. The inductor component according to claim 3, wherein a gap between the principal surface and a surface facing the principal surface of the first flange portion is filled with resin.

13. The inductor component according to claim 2, wherein a dimension of the top plate in a direction along the central axis is longer than a dimension of the drum-shaped core in the direction along the central axis.

14. The inductor component according to claim 3, wherein a dimension of the top plate in a direction along the central axis is longer than a dimension of the drum-shaped core in the direction along the central axis.

15. The inductor component according to claim 2, wherein a dimension in a direction orthogonal to the central axis and parallel to the principal surface is regarded as a width dimension, and a width dimension of the top plate is longer than a width dimension of the first flange portion.

16. The inductor component according to claim 3, wherein a dimension in a direction orthogonal to the central axis and parallel to the principal surface is regarded as a width dimension, and a width dimension of the top plate is longer than a width dimension of the first flange portion.

17. The inductor component according to claim 1, wherein the vertical surface includes a first vertical surface and a second vertical surface perpendicular to the first vertical surface, and the inclined surface intersects the first vertical surface and the second vertical surface.

* * * * *